United States Patent [19]
Gomi et al.

[11] Patent Number: 4,912,582
[45] Date of Patent: Mar. 27, 1990

[54] FLOPPY DISK DRIVE SYSTEM WITH IMPROVED RECORD/PLAYBACK HEADS

[75] Inventors: Akihiro Gomi; Shin Shibata; Misuo Oguchi; Sumio Gomi, all of Suwa, Japan

[73] Assignee: Seiko Epson Kabushiki Kaisha, Tokyo, Japan

[21] Appl. No.: 277,391

[22] Filed: Nov. 21, 1988

Related U.S. Application Data

[63] Continuation of Ser. No. 664,127, Oct. 24, 1984, abandoned.

[30] Foreign Application Priority Data

Oct. 25, 1983 [JP] Japan .................. 58-199639
Aug. 7, 1984 [JP] Japan .................. 59-165075

[51] Int. Cl.$^4$ ............................. G11B 5/48
[52] U.S. Cl. .................. 360/99.01; 360/104; 360/103
[58] Field of Search .......... 360/99, 103, 104, 105, 360/122

[56] References Cited

U.S. PATENT DOCUMENTS

| | | | |
|---|---|---|---|
| 3,855,625 | 12/1974 | Garnier et al. | 360/103 |
| 4,191,980 | 5/1980 | King et al. | 360/99 |
| 4,263,630 | 4/1981 | Pierson | 360/104 |
| 4,285,019 | 8/1981 | Scott et al. | 360/103 |
| 4,320,426 | 3/1982 | Thompson | 360/104 |
| 4,625,249 | 11/1986 | Iwata | 360/104 |
| 4,651,243 | 3/1987 | Daste et al. | 360/104 |

Primary Examiner—John H. Wolff
Attorney, Agent, or Firm—Blum Kaplan

[57] ABSTRACT

A floppy disk drive system for double-sided recording and playback having first and second heads positioned to hold a disk therebetween is provided. The first and second heads each have a read/write gap and each have a contacting plane for contacting the disk. Each such contacting plane has an inner edge position toward the center of the disk and an outer edge positioned toward the outer circumference of the disk. The gap of the first head is closer to the outer circumference of the disk than the gap of the second head when the heads are assembled in facing relation. The distance between the center of the inner edge of the contacting plane of the first head and the center of the read/write gap of the second head is about 0.6 mm or less. The contacting plane of the second head may be larger than that of the first head, said enlargement being in the direction of the inner circumference of the disk. At least one of the heads may have the two inner corners thereof chamfered by about C 0.5 or more and the corresponding corners of the contacting plane may be smoothly rounded. The contacting plane of the first head may be larger than that of the second head, said enlargement being in the direction of the outer circumference of the disk.

39 Claims, 11 Drawing Sheets

HEIGHT OF HEAD
ABOVE THE REFERENCE POSITION

HEIGHT OF HEAD
ABOVE THE REFERENCE POSITION

HEIGHT OF HEAD
ABOVE THE REFERENCE POSITION

HEIGHT OF HEAD
ABOVE THE REFERENCE POSITION

HEIGHT OF HEAD
ABOVE THE REFERENCE POSITION

HEIGHT OF HEAD ABOVE THE REFERENCE POSITION

FLOPPY DISK DRIVE SYSTEM WITH IMPROVED RECORD/PLAYBACK HEADS

This is a continuation of Application Ser. No. 06/664,127, filed on Oct. 24, 1984.

BACKGROUND OF THE INVENTION

This invention relates to a magnetic read/write head for a floppy disk drive system.

Currently, two types of floppy disk drive systems available are a single-sided head type, in which a magnetic read/write head (hereinafter referred to as a "head") is fixed on one side of a floppy disk (hereinafter referred to as a "disk"), and a double-sided head type in which the heads are provided on both sides of the disk. The invention pertains to the double-sided head type.

In current two-headed type disk systems there are inherent problems which result from the disk being warped or transformed from a straight planar surface to one having a complex curvature. This transformation of the disk results in the heads not being positioned properly on the disk and thus not reading or playing accurately. The problems inherent with the prior art double-sided head type disk drives can be better understood with reference to FIGS. 1, 2 and 3.

FIG. 1 depicts conventional double-sided heads each in contact with a disk which is held between the heads. In FIG. 1, the left-hand side is that closest to the inner circumferential track of the disk (the side closest to the center of the disk and hereinafter referred to as the "inner side") and the right-hand side of FIG. 1 is the side of the outer circumferential track of the disk (hereinafter referred to as the "outer side"). An upper head $1a$ and a lower head $1b$ are in contact with a disk 8 being held therebetween. The contacting plane 2 of the heads $1a$ and $1b$ with disk 8 is usually divided into two portions by a groove 7. In some instances, groove 7 is provided on both heads, in others, groove 7 is provided on only one of the heads and in still other cases, no such groove is provided in either head. A faceted portion 3, called a chamfer, is provided at the rim portion of the contacting plane of each head, which continues to the side surface of the head.

According to current industrial standards for the floppy disk, a gap center $6a$ of the upper head is formed closer to the inner side of disk 8 than the gap center $6b$ of the lower head by a certain distance. In other words, in general, with the upper and lower heads aligned, gap $6a$ of upper head $1a$ is positioned closer to the inner side of disk 8 and gap $6b$ of lower head $1b$ zis positioned closer to the outer side of disk 8. However, the instant invention applies to both the case where the gap of the upper head is positioned closer to the inner side of the disk than the gap of the lower head, as is usual, and to the case where the gap of the upper head is positioned closer to the outer side of the gap than that of the lower head. In the following description, only the former case which is commonly used is referred to for brevity and simplicity. However, the description is also applicable to the latter case if the terms "upper" and "lower," and "high" and "low," respectively; in the description are exchanged. Heads $1a$ and $1b$ are commonly fixed to a pair of gimbal springs $4a$ and $4b$ (hereinafter referred to as the "gimbals"), respectively, which, in turn, are secured to a pair of carriages $9a$ and $9b$, respectively. Lower carriage $9b$ is usually mounted on the frame of the floppy disk drive system via the guide shaft 11.

The prior art head constructions are provided with various combinations of upper and lower gimbals. In one embodiment, the heads attached thereto are allowed to rotate in two directions, that is, in the direction along the radius of the disk and in the direction along the tangent line of the circumference of the disk. In other embodiments, the upper gimbal allows the head to rotate in two directions while the lower gimbal allows the head to rotate in only one direction, or the upper gimbal allows the head to rotate in two directions while the lower gimbal fixes the head. The rotatable gimbals are supported by a pivot 5 from behind and are rotatable around the pivot 5, thereby adjusting to the deflection or shaking of the disk to achieve accurate reading and recording.

FIG. 1 shows the ideal condition of the contact between the heads $1a$ and $1b$ and disk 8. In practice, however, the heads are generally positioned higher or lower than the proper position for holding the disk. Also, since the rotating disk between such heads is fairly hard and shaped like a film, partial transformation such as flexing of the disk occurs. Thus, the disk distorts in a complex manner between the upper and lower heads during operation, as shown by FIGS. 2 and 3. The conditions of the contact between heads and disk of FIGS. 2 and 3 are described below. In this discussion, the position of the head that accurately coincides with the proper location of the disk (FIG. 1) is referred to as the "reference position" of the head.

FIG. 2 shows the case where head $1a$ is pushed up by the distorted disk 8 to a position are higher than the reference position, and consequently, higher than the position of the lower head $1b$. As is shown in FIG. 2, disk 8 distorts along a complex curve between the heads due to the above-mentioned factors. To be specific, in the example of FIG. 2, disk 8 extends upwardly from a point of contact $2c$ with lower head $1b$, pushing upper head $1b$ upwardly. Point of contact $2c$ is located on the inner side (hereinafter referred to as the "inner edge") of contacting plane 2 of lower head $1b$. The distorted disk 8 contacts the upper head at point $2f$ and bends downwardly toward the lower head to contact the lower head. Then, the disk bends upwardly toward the upper head again, contacting upper head $1a$ at point $2g$, and finally extends out from the outer side of the head. As is apparent from FIG. 2, on the inner side, the contacting point $2f$ of the disk and the upper head is likely to be closer to the center of the disk but not at gap $6a$. On the outer side, the disk contacts the upper head again at a point near the outer side of the plane of the head. Accordingly, the output of the upper head is much more unstable than the output of the lower head. Thus, the allowable range of the head position over which satisfactory output can be obtained from both of the upper and lower heads is limited by the upper head condition as above.

The allowable range of the head position is one of the values quantatively expressing the condition of the contact between the head and the disk, as is illustratively explained by FIG. 4. FIG. 4 is a graph showing the relative change of the output of the heads when the head position is shifted with respect to the reference position. The range of the head position over which the output is larger than the lowest limit 12 of the acceptable output is called the allowable range of the head position, which is the hatched area 13 in FIG. 4.

When disk 8 is distorted, as shown in FIG. 3, upper head $1a$ is pushed down and the disk and is lower than the reference position. Specifically, the disk is contacted by the inner edge 2h of the contacting plane of upper head 1a, then contacts lower head 1b and then contacts both the upper and lower heads in the region 2i near the outer edge of the heads.

In this case, the disk likely contacts the upper head not at gap 6a of upper head 1a, but at a point closer to the outer side of the disk than the upper head gap. Accordingly, the output of upper head 1a is lower than that of lower head 1b and the allowable range of the head position is limited. Moreover, the output of lower head 1b also tends to be reduced by the increased distortion of the disk.

The above problem may be improved to a certain degree by varying the distance between the inner edge of the upper head and the gap of the upper head, although such a method is not a thorough solution of the problem. One reason for this is that if the distance therebetween is increased, the width of the head in the direction of the radius is increased. Consequently, the tolerance of the relative inclinations of the head with respect to the disk decreases, which leads to a difficulty of mass production and the rise in the manufacturing cost.

Furthermore, in the conventional head mechanism, if the distance between the gap of the upper head and the inner edge of the upper head is increased, the distance between the gap of the upper head and the inner edge of the lower head is necessarily increased. Under such condition, if the head is located higher than the reference position, the contact between the upper head gap and the disk is insufficient as described previously. Thus, the desirable conditions when the head is higher and when the head is lower than the reference position are incompatible so that the allowable range of the height of the heads is not expanded.

Reference is now made to FIG. 5 which is a top plan view of the contacting plane of lower head 6b, by way of an example. By examination of the contacting condition between head 6b and the disk 8 of a system using the head of FIG. 5, it has been found that the head and the disk do not contact most intimately near the gap of the head, but rather, contact most intimately at the four corners and at the inner edge of the head. The positions having the most intimate contact are contact regions 17, shown enclosed by the broken lines in FIG. 5. Where, as shown in FIG. 5, the head and disk do not necessarily contact intimately at the gap of the head, the output of both of the upper and the lower heads likely becomes unstable and insufficient.

Moreover, in the double-sided head system, another problem generally arises due to the rigidity of the disk, namely, when the disk is higher than the reference position, the rigidity of the gimbal and the disk balance to cause the upper head to incline to the outer side to some degree as shown by FIG. 2. Under such a condition, if the distance g between gap 6a of lower head 1b and the outer edge of upper head 1a is large, the space between the upper and the lower heads near the lower head gap is large. Accordingly, the pressure by the upper head on the disk is insufficient and close contact between the lower head gap and the disk is not obtained.

Thus, it is necessary to decrease the distance g until the disk and the lower head gap contact each other intimately. However, in the case where the side lines of the upper and the lower heads are on the same line as in the conventional systems, when the head is not at the reference position, an upward distortion of disk 8 to the position shown by dashed line 10 in FIG. 2 is observed to occur near the edge of the outer side of the contacting plane of lower head 1b. This distortion 10 of the disk pushes up the upper head and reduces the output of the lower head.

The problems in the prior art described above may be summarized as follows:

First, when the upper head is higher than the reference position, intimate contact between the head and the disk is usually obtained at a position toward the inner side with respect to the upper head gap and the output of the upper head deteriorates.

Second, when the upper head is lower than the reference position, intimate contact between the head and disk is usually obtained at a position toward the outer side with respect to the upper head gap and the output of the upper head deteriorates.

Third, the conventional head contacts the disk most intimately not at the gap, but at the four corners of the contacting plane of the head and at the inner edge thereof.

Fourth, if the upper head is higher than the reference position, the distortion 10 of FIG. 2 of the disk occurs near the outer edge of the contacting plane of the lower head with the disk.

As mentioned above, in the conventional double-sided head systems, there are many times when the output of the upper head deteriorates with respect to the output of the lower head. Accordingly, the allowable range of the head position is greatly limited by the upper head. This is specially true, in the case of small-sized and high-density disks such as those of 3.5 or 3 inch type, having a hub made of metal or hard plastic provided in the center part of the disk in order to improve the accuracy of addressing the tracks. Since such a hub occupies the portion very close to the innermost track of the disk and the radius of the track is small, the rigidity of the disk affects the contact between the head and the disk. As such a disk of high rigidity is formed as a film, the distortions of the disk, as mentioned before, occur very frequently and the contact between the head and the disk and the output between the heads are largely affected. The quality of the contact between the head and the disk and the output of the heads depend primarily, on the effect of such distortions of the disk. In high-density magnetic recording and reproducing, the present acceptable range of the space between the head and the disk is less than 0.2 microns. In the conventional head system, a space between the head and the disk not within the above range is easily produced. Thus, a system using small disks, such as those of the 3.5 or 3 inch type, or disks on which the magnetic layer is a metal film formed by an evaporation or sputtering process, is significantly affected by the high rigidity of the disk. This results in the contacting condition between the head and disk being poor and unstable.

Accordingly, when the conventional head is used for such disks, it is necessary to position accurately the head and to restrict the inclination of the head and, even then adjustment of the position of the head with respect to the disk is sometimes necessary. The requirements as above cause the manufacturing cost of the drive system to increase.

SUMMARY OF THE INVENTION

Generally speaking, in accordance with the invention an improved configuration of upper and lower heads are provided in order to accomodate varying positions of the heads relative to the disk.

The invention also provides for an improved shaped recording head which allows for greater flexibility in the positioning of the heads relative to the disk.

The floppy disk drive system of the instant invention provides opposed first and second heads for cooperating with a disk therebetween. The first head has a read/write gap which is closer to the outer side of the disk than the read/write gap of the second head when the two heads are located in the proper position. The distance between the inner edge of the contacting plane of the first head with the disk and the center of the read/write gap of the second head is 0.6mm or less.

The floppy disk drive system of the instant invention also includes first and second heads for cooperating with a disk therebetween, wherein the first head has a read/write gap closer to the outer side of the disk than the read/write gap of the second head and the contacting plane with the disk of the second head is enlarged in the direction of the inner side of the disk.

A further embodiment of the invention provides that at least two two inner corners of the magnetic read/write head for the floppy disk system are chamfered by CO.5 or more and the corners of the contacting plane of the head with the disk corresponding to chamfered corners are smoothly rounded. All four corners of the head may be chamfered, with the corners of the contacting plane of the corresponding chamfered corners being smoothly rounded.

The invention also provides a floppy disk drive system of the double-sided writing and reading type including a first and a second head for holding the disk therebetween. The first head is formed with a gap closer to the outer circumferential track of the disk than the gap of the second head when the two heads are in facing relation. The contacting plane of the first head with the disk is enlarged with respect to the contacting plane of the second head in the direction of the outer circumferential track of the disk.

Accordingly, it is an object of the invention to provide an improved floppy disk drive system.

Another object of the invention is to provide an improved head configuration for a two-headed floppy disk drive system wherein one of the heads has an enlarged surface or plane for contacting the floppy disk.

A further object of the invention is to provide an improved floppy disk drive system adapted to eliminate problems caused in conventional head systems by the rigidity of the floppy disk.

Still other objects and advantages of the invention will in part be obvious and will in part be apparent from the specification.

The invention accordingly comprises the features of construction, combinations of elements and arrangements of parts which will be exemplified in the constructions hereinafter set forth, and the scope of the invention will be indicated in the claims.

BRIEF DESCRIPTION OF THE DRAWINGS

For a fuller understanding of the invention, reference is made to the following description to be taken in connection with the accompanying drawings in which.

DESCRIPTION OF THE PREFERRED EMBODIMENTS

Figure 6:
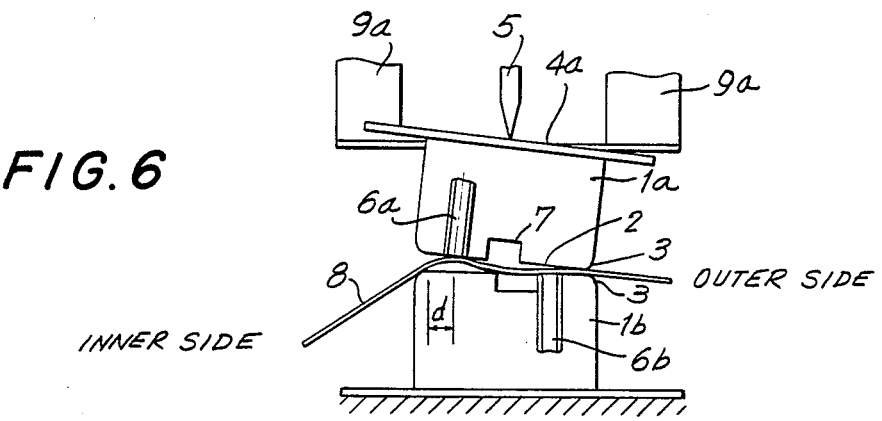
FIG. 6 is a side elevational view which illustrates the contact condition between the heads in accordance with the instant invention and the disk when the upper head is higher than the reference position.

The first embodiment of this invention is related to eliminating the first problem of the conventional head system, namely, the problem that arises when the head is higher than the reference position. In this instance, the disk 8 is distorted in a complex manner between the heads 1a and 1b as shown in FIG. 6, as mentioned previously. As the lower head is higher than the reference position, the disk contacts the contacting plane of the lower head on the inner side thereof, i.e., the side facing the center of the disk. The disk is pushed up until it contacts the upper head. If the area on the upper head 1a contacting the disk 8 is at the gap 6a of the upper head, the desirable contact between the head and the disk is made and a sufficient output from the head is obtained. Therefore, in accordance with the invention and in order to make such a desirable contact between the upper head and the disk, the distance d from the inner edge of the contacting plane of the lower head to the center of the read/write gap of the upper head (when the upper and the lower heads are in intimate contact with each other without a disk therebetween) is limited to less than 0.6mm. If the distance d is too large, the output of the upper head deteriorates as in the conventional system. The acceptable range of the value of the distance d depends on the configurations of the head, the disk, or the hub, or the height of the head from the reference position. If the distance d is less than about 0.6mm, the desirable contact between the head and disk is obtained over a rather wide range of the height of the head from the reference position.

Figure 7:
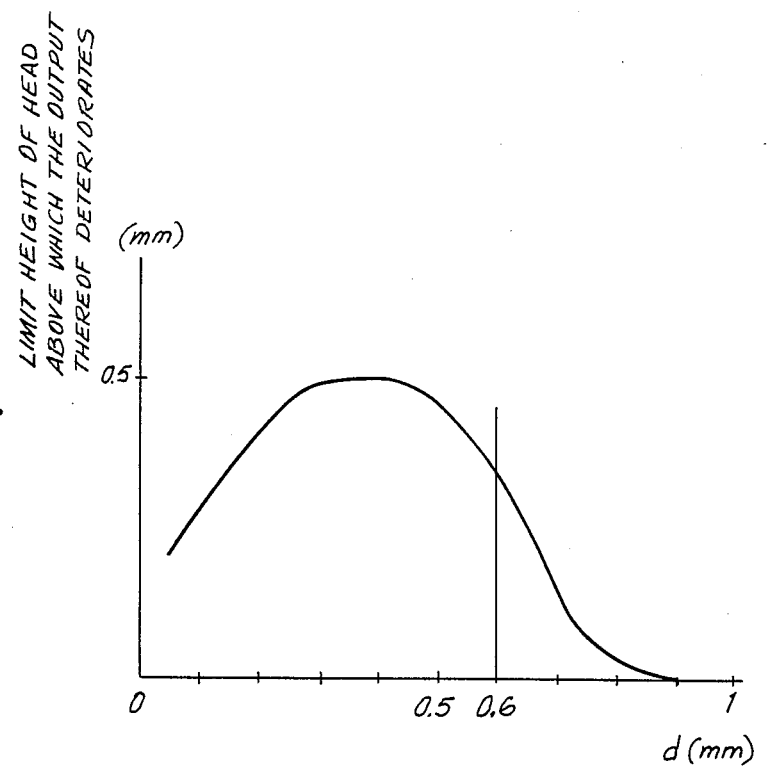
FIG. 7 is a graph showing the change in the height limit of a head above which height the relative output of the heads falls below the lowest allowable output level with respect to the variation of the distance d between the inner edge of the contacting plane of the lower head and the center of the upper head gap.

FIG. 7 illustrates the results of the measurement of the change in the output of the head in response to the variation of the value of d. In FIG. 7, the change in the height limit of the head from the reference position above which height the output of the head deteriorates, (that is, above which height the relative output of the head falls below the lowest limit of the allowable output level) with respect to the change of the value of d is shown.

As is apparent from FIG. 7, in the range in which the value of d exceeds about 0.6mm, the height limit of the head above which height the output of the head deteriorates becomes remarkably small. Accordingly, the desirable value of d is defined to be less than 0.6mm.

Figure 8:
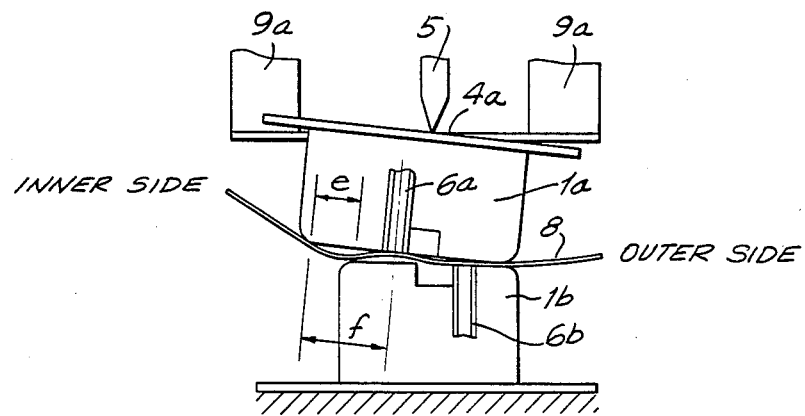
FIG. 8 is a side elevational view which illustrates the contact condition between the head, in accordance with the instant invention, and the disk when the heads are lower than the reference position.

The second embodiment of this invention, as shown in FIG. 8, is designed to present a solution of the second problem of the prior art, that is, the problem arising when the head is lower than the reference position. When the head is lower than the reference position, the disk 8 first contacts the inner edge of the contact plane of the upper head and is pushed down. The disk then contacts the lower head 1b and again contacts the upper head as shown in FIG. 8. As described previously with reference to the prior art, if the distance f from the inner edge of the contacting plane of upper head to the center of upper head gap 6a were small, intimate contact between the upper head gap and disk would not be obtained.

Therefore, in accordance with the invention, as shown by FIG. 8, a portion of the contacting plane of upper head 1a is enlarged as much as distance e relative to lower head 1b. When the distance e of the enlargement is reasonably large, the distance f also becomes large. Consequently, the point at which the disk 8 again contacts the upper head 1a, after contact with the lower head is near or at the upper head gap 6a and thus a desirable contact between the gap and the disk is obtained as shown in FIG. 8. In other words, the distance between the inner edge of the contacting plane of the upper head and the point where the disk again contacts the upper head is adjusted by enlarging the contact plane of the upper head in a direction toward the center of the disk by as much as distance e. The effect as above is fully obtained when e is from 0.5mm to 1.5mm.

As described above, in the first and second embodiments of this invention, the contact between the head and disk when the head is higher and lower than the reference position, respectively, is improved. However, if the above two embodiments are combined into one, excellent contact between the head and disk is realized as explained below.

It is possible to apply the first embodiment to a conventional head having no enlargement. However, in this case, when a head is 1 lower than the reference position, the usual problems of the conventional head in such position can be expected. Similarly, in a head having an enlargement as shown in the second embodiment of this invention, when distance d is more than 0.6mm, an improved effect is not expected when the head is higher than the reference position. On the other hand, in the conventional head, in the case where the head is lower than the reference position, the improved effect is expected to some degree by increasing the distance f, the distance from the inner edge of upper head 1a to gap thereof. However, as mentioned in the above discussion relating to the problems of the conventional heads, such a conventional head is not superior in essence when the head is higher than the reference position and thus no improved effects would be expected in such a conventional head.

Figure 14A:
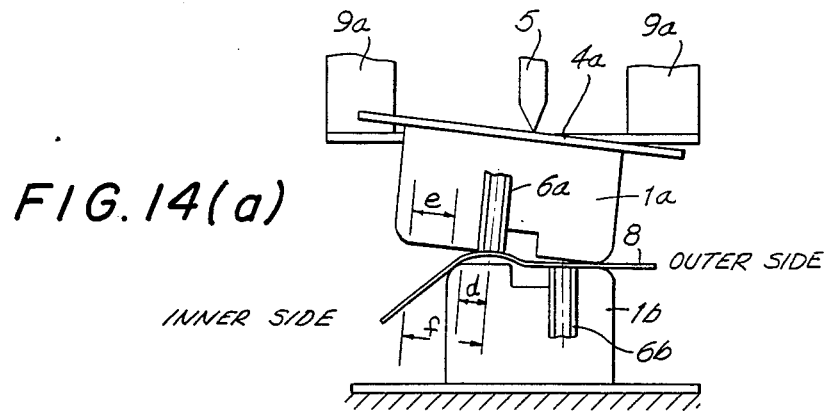
FIGS. 14(a) and 14(b) illustrate the contact condition between the heads of the third embodiment of this invention and the disk when the heads are higher and lower than the reference position, respectively.
Figure 14B:
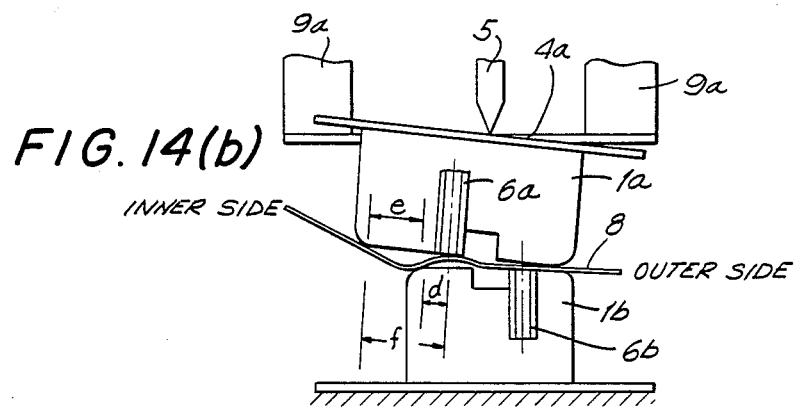

FIG. 14 shows the third embodiment of this invention in which the first embodiment and the second embodiment are combined. In the third embodiment, the improved effects are obtained whether upper head 1a is higher o lower than the reference position. According to FIG. 14, an enlargement is provided on the upper head in the amount of distance e and the distance d on the lower head is less than 0.6mm. Further, it is possible to selectively define the value of distances d and f in a coordinate manner.

Figure 9:
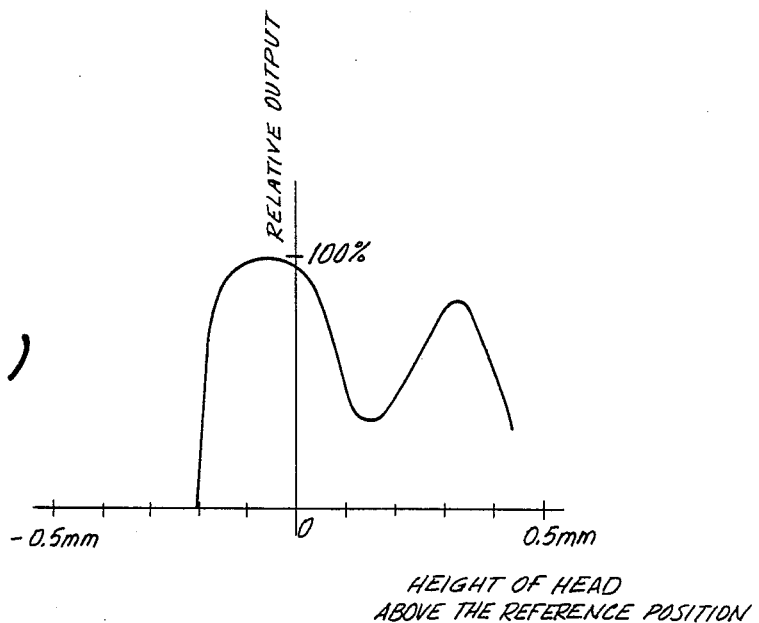
FIGS. 9(1), 9(2), 9(3) and 9(4) are graphs which illustrate the changes in the outputs of a conventional head, and heads of the first, second and third embodiments, respectively, of this invention, with respect to the variation in the height of the heads above the reference position.
Figure 9:
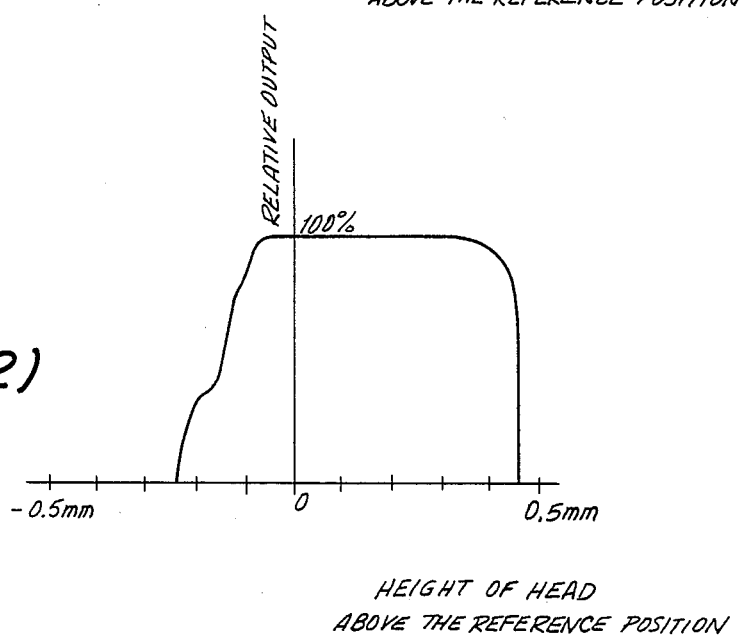
Figure 9:
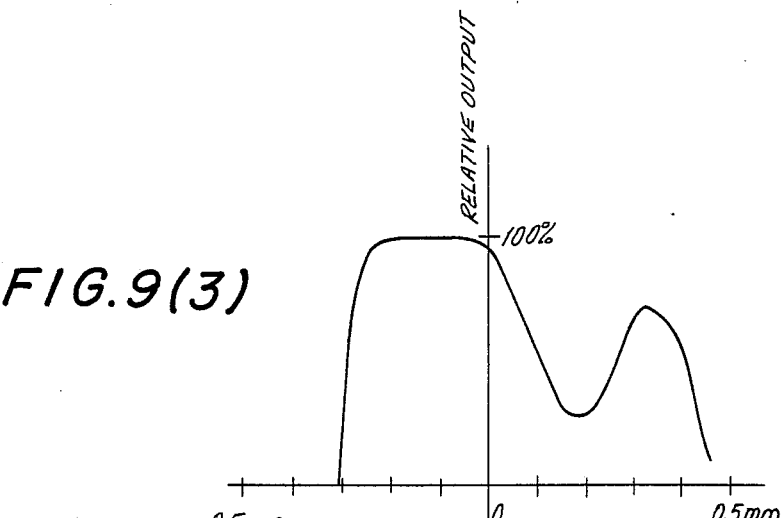
Figure 9:
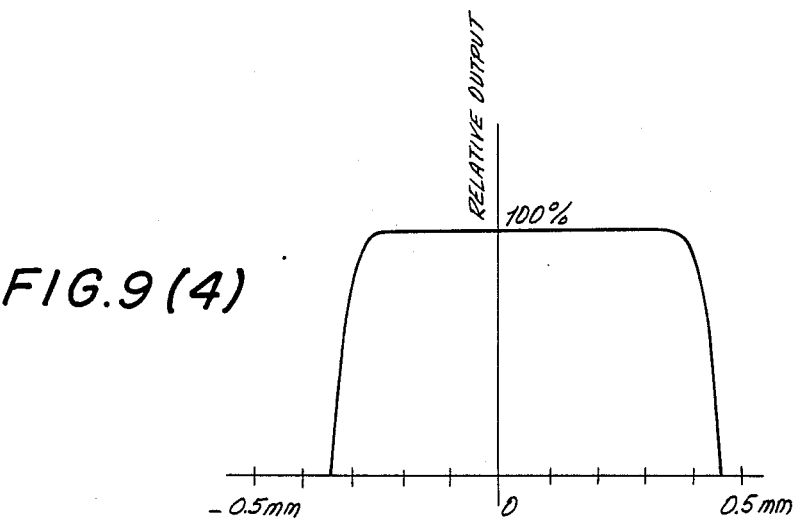

FIG. 9 shows the effect of the third embodiment of this invention. FIG. 9 (1) shows the relation between the position of a conventional head and the relative output thereof. In the same manner as (1), FIGS. 9-(2), (3) and (4) show such a relationship for the first, second and third embodiments, respectively. From FIG. 9, it is shown that the third embodiment is the most improved.

Figure 11A:
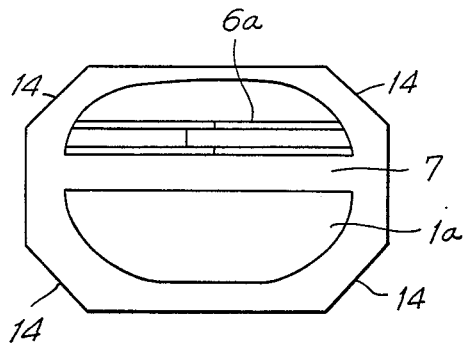
FIGS. 11(a) and 11(b) are plan views of the upper head and lower head of the fourth embodiment of this invention.
Figure 11B:
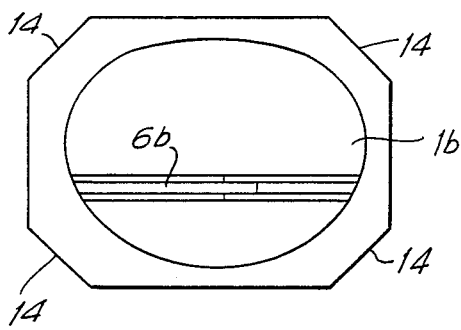

A fourth embodiment offers a solution to the third problem of the conventional head. In the fourth embodiment, the four corners of the head, or at least the two inner corners thereof, are cut and the corresponding corners of the contacting plane are smoothly rounded. FIG. 11 illustrates this embodiment. As mentioned above, in the conventional head, a disk contacts the head most intimately not at a portion near the gap thereof, but at four corners of the contacting plane and inner edge thereof. Therefore, it does not always follow that the portion near the gap contacts the disk. In particular, a head having four sharp corners and having a contact plane, the curvature of which is small, has a strong tendency to make insufficient contact with the disk. Accordingly, by providing a head having corners which are cut or chamfered produce chamfered corners 14 and a contact plane which is rounded, as mentioned above, the disk contacts the head easily at the portion near the gap and therefore good output may be obtained.

Figure 5:
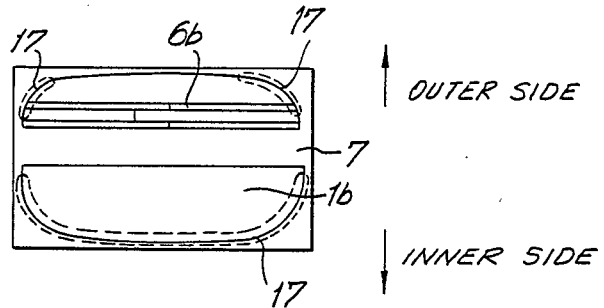
FIG. 5 is a top plan view of an embodiment of the contacting plane and gap of a conventional lower head.

According to the conventional art, the disk strongly contacts the head in the region 17 of FIG. 5, particularly at the four corners. Therefore, the head does not come in contact with the disk at the gap portion which is necessary because the gap portion is the read/write portion of the head. The four corners of the head are chamfered in FIG. 11(A) so as to force the disk to contact gap 6A of head 1A.

Figure 4:
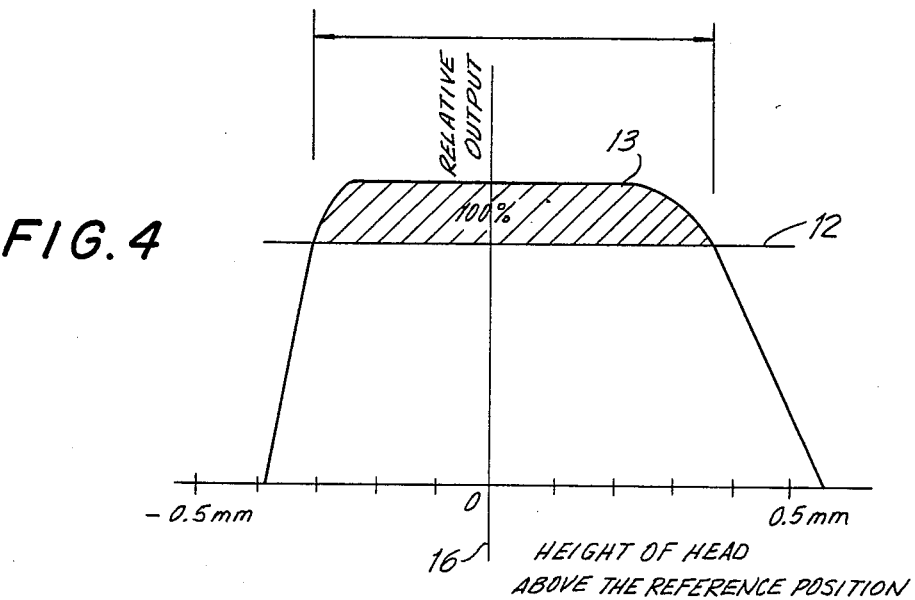
FIG. 4 is a graph which illustrates the variation of the output of a head with respect to the height of the head above the reference position.
Figure 10:
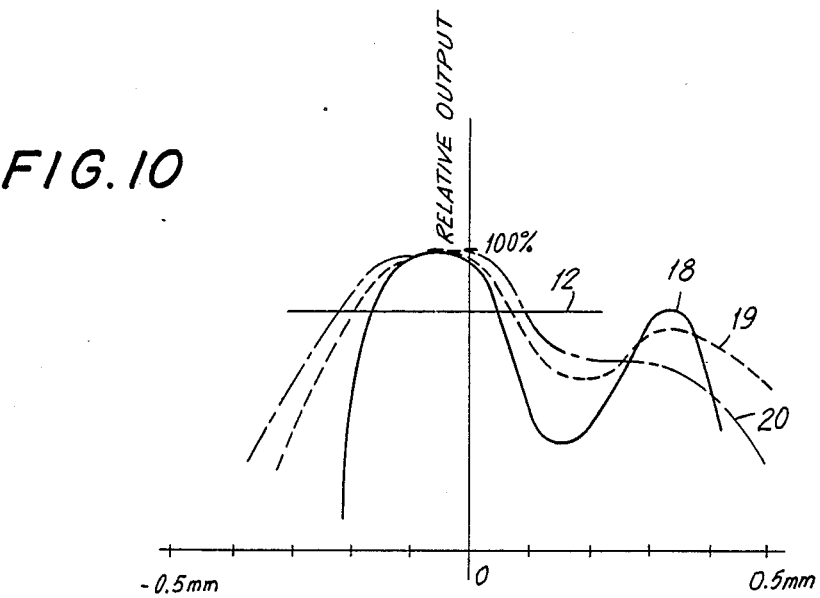
FIG. 10 is a graph which illustrates the change in the output of a head with respect to the variation of the amount of cutting the four corners of the head, in accordance with this invention.

FIG. 10 shows the comparison between the conventional head and the head having four corners cut, as described in the fourth embodiment. In FIG. 10, curves 18, 19 and 20 show the relation between the height of the head and relative output thereof, in the same manner as FIG. 4. Curve 18 shows the relation for the conventional head and curves 19 and 20 show those of a head having corners cut by C 0.5 and a head having corners cut by C 1, respectively. As shown in FIG. 10, by cutting the corners of the head by the order of C 0.5, the region above a line 12 which shows the acceptable limit of relative output is expanded and further, the reduction of relative output at both acceptable limits of the height of the head is gentle. This then shows that the improved effect is offered by this embodiment of the invention.

Furthermore, the head according to this embodiment of the invention results in the secondary benefit of reduced wear on the disk. Specifically, as the head is relieved of intimate contact between the four corners and inner edge thereof and therefore the wear of the disk is reduced and the life thereof is increased.

In FIG. 11 and the above description, four corners of the head are cut. However, when the two inner corners of the head are cut the same results as above has been found.

The fourth embodiment of the invention can be applied to the single-sided recording and reproducing type floppy disk drive and the same results as above can be obtained. Therefore, the single-sided recording and reproducing type floppy disk drive is also included within the scope of this embodiment of the invention.

Figure 1:
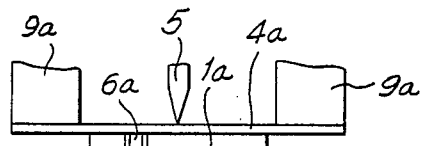
FIG. 1 is side elevational view which illustrates the ideal contact condition or reference position between conventional double-sided read/write heads and a floppy disk.
Figure 1:
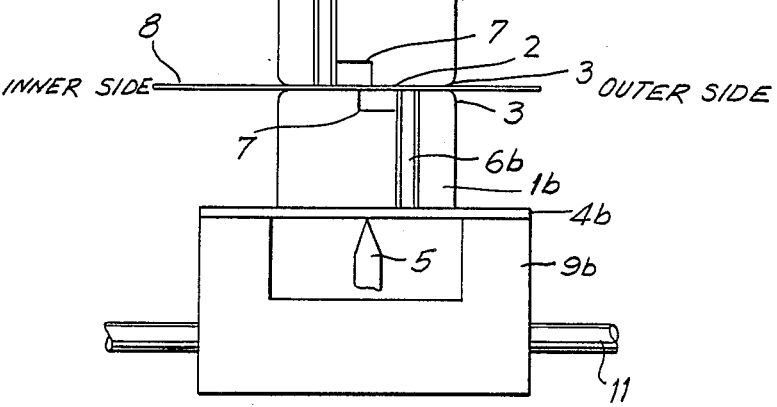
Figure 2:
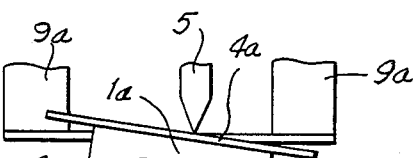
FIG. 2 is a side elevational view which illustrates the contact condition between conventional double-sided heads and a disk when the upper head is higher than the reference position.
Figure 2:
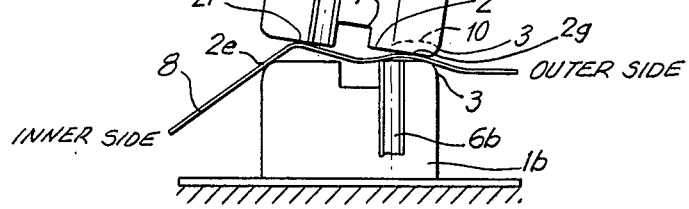
Figure 3:
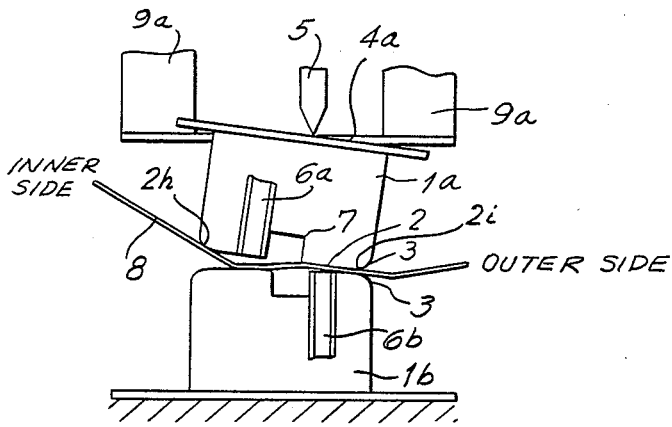
FIG. 3 is a side elevational view which illustrates the contact condition between the conventional double-sided heads and the disk when the upper head is lower than the reference position.
Figure 12:
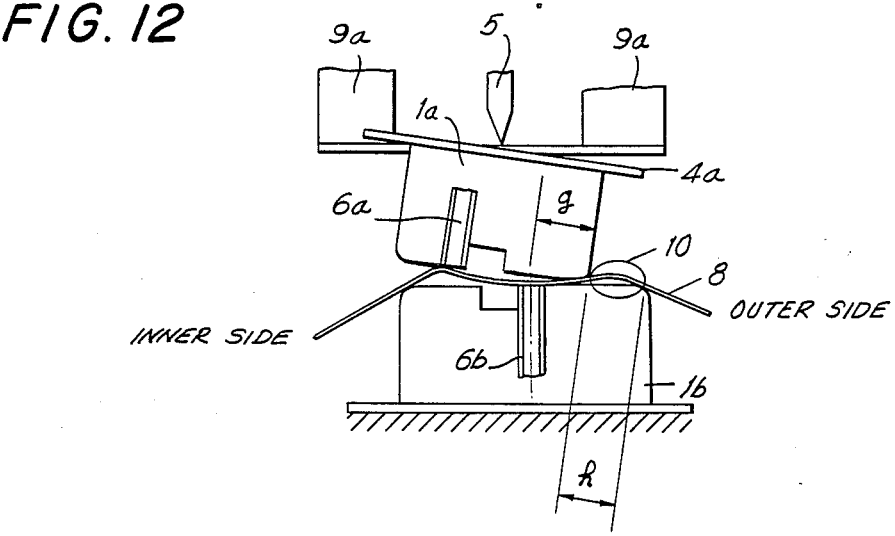
FIG. 12 is an elevational view which illustrates the contact condition between the heads of the fifth embodiment of this invention and the disk.

The fifth embodiment is intended to solve the fourth problem of the conventional head. This embodiment is shown in FIG. 12. As mentioned above, in the conventional head a slight rise 10 of the disk is observed when the heads are in the position as shown in FIG. 2. This causes reduction of the output of the lower head. In this embodiment, the contacting plane of the lower head is enlarged to the outer side to extend past the outer edge of the upper head. The head shown in FIG. 12 shows the slight rise 10 of disk 8 over the enlargement of lower head 1b. In other words, in the fifth embodiment, the enlargement is provided over the portion where a rise 10 occurs. This enlargement, shown as distance h in FIG. 12, is preferably from 0.5mm to 1.5mm. As a result, no rise occurs in the portion near the gap of the lower head and good output of the lower head is obtained. Furthermore, it is possible to make distance g between the center of gap 6b of lower head 1b and the outer edge of upper head 1a sufficiently small. As a result of the above, output of the lower head is stabilized.

Figure 15A:
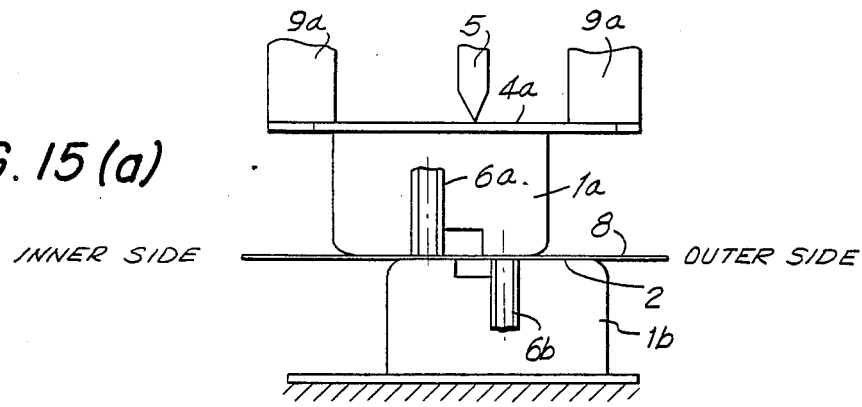
FIG. 15(a) is a sectional view of the heads of the sixth embodiment of this invention assembled with the disk therebetween
Figure 15B:
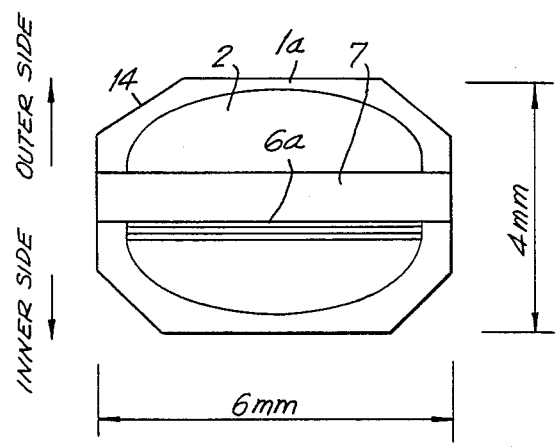
FIGS. 15(b) and 15(c) illustrate the contacting plane of the upper head and the lower head, respectively, in accordance with this invention.
Figure 15C:
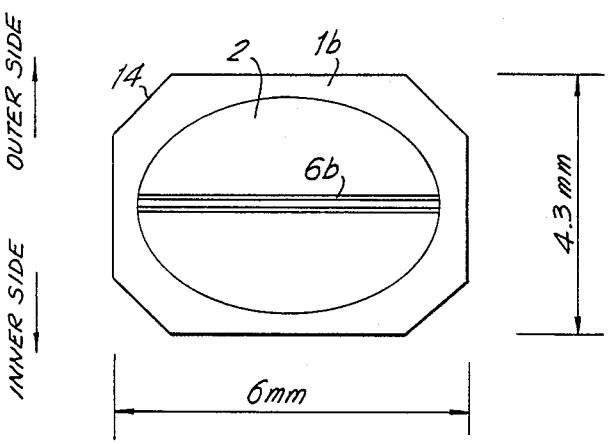

A sixth embodiment is shown in FIG. 15 which incorporates all of the above embodiments. In the drawings of all of the abovementioned embodiments, the lower heads are fixed and the upper heads have the degree of freedom in two directions, that is, are rotatable into two directions. But this invention is not restricted to the above condition. Because, in accordance with this invention, lower heads and upper heads having any degree of freedom may be used.

Moreover, in the above embodiments, the gap of the upper head is provided closer t the inner side than that of the lower head. However, the reverse may also be used. Therefore, this invention includes the latter case in which the above description is applied by exchanging "upper" and "lower" and "inner" and "outer," respectively.

It can thus be seen that in the conventional head, the gap thereof frequently does not contact the disk properly. However, in the head accordingly to this invention, the influence of a distortion of the disk is reduced. The head of the instant invention is designed so as to adapt to and allow for such distortion. Thus, stable and good contact between the head and the disk at the portion near the gap is obtained, even though the allowable distance between the head and the disk is limited to 0.1 to 0.2 microns.

The most important effect of this invention is that a good contacting condition between the head and the disk is realized and a good output is obtained in a small-sized (for example, of the industrial standard of 3.5 or 3 inches) and rigid disk, as well as in a large-sized (for example, of the industrial standard of 8 or 5.25 inches) disk.

Figure 13A:
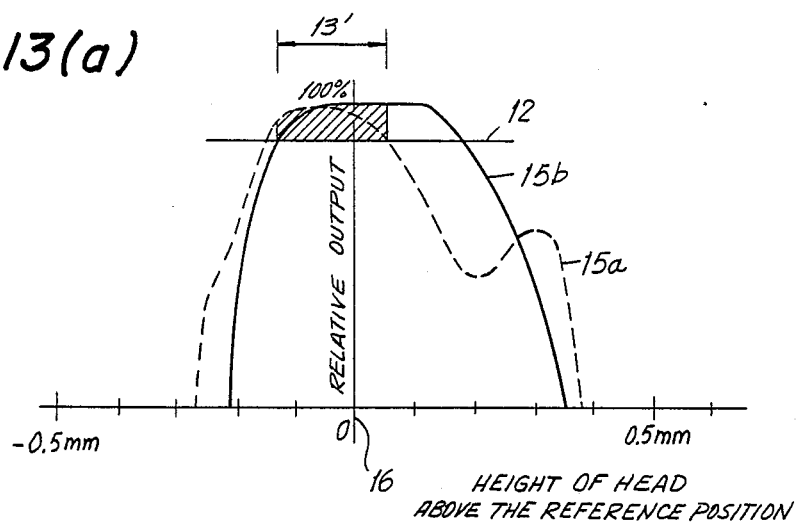
FIGS. 13(a) and 13(b) are graphs which illustrate the changes in the relative output of a conventional head and a head in accordance with the instant invention, respectively, with respect to the variation in the height of the head above the reference position.
Figure 13B:
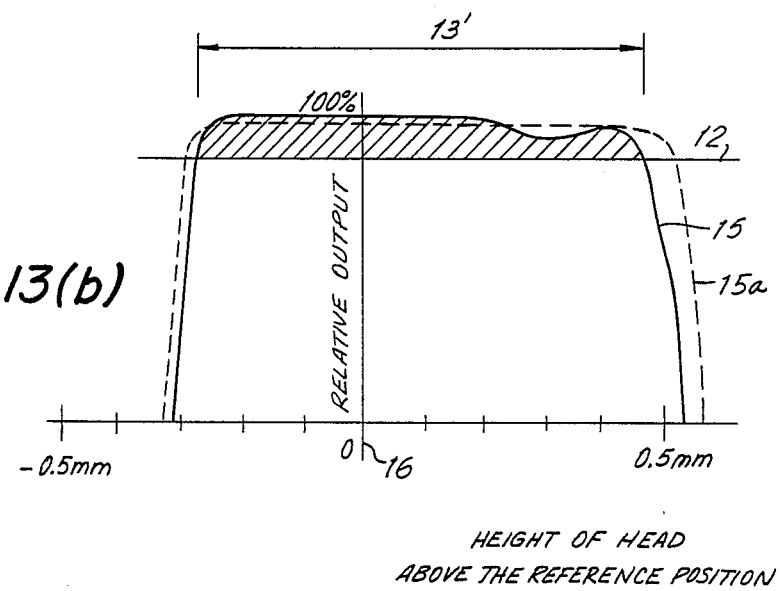

The concrete effect of this invention is shown in FIG. 13. FIG. 13 (a) shows the relation between the height of the head and output thereof for the conventional head. FIG. 13 (b) shows that of the head which combines the features of the first, second, third, fourth and fifth embodiments. A micro floppy disk having a diameter of approximately 3.5 inches was used to obtain the results shown in FIG. 13. In this disk, as a steel hub is used at the center, the rigidity of the innermost track of the disk is extremely high and thereby greatly affects the output of the heads. From FIG. 13, it is shown that the instant invention offers stable and good output over a wide range of positions of a head. In the head according to the instant invention, the following effects are obtained:

In the region above line 12, which shows limit of relative output, good output of the upper and the lower heads is obtained over a wide range of the height of the head. It is not necessary to change the type of head, the floppy disk or the floppy disk drive system. Rather, only some changes in the design of the head and chamfering conditions are required. Therefore it is possible to omit some of the processes of manufacturing of a floppy disk drive system such as the adjustment of the position of the head and to simplify the structure of a floppy disk drive system. Accordingly, the manufacturing cost thereof is reduced by the practicing of the instant invention.

Furthermore, this invention offers a method by which a stable and good contact between a gap of the head and the disk is provided. On the other hand, in the conventional head, the load applied to the head has to be increased in order to urge the disk to the head. As shown from the above, the instant invention provides a good contact condition without such secondary means as in the conventional head systems. As a result, the instant invention enables one to reduce the load applied to the head and thus avoid abrasion and damage of the disk resulting from contact with the head.

This invention may be used for any double-sided head arrangement provided in a floppy disk drive system. The invention may be applied to all of the floppy disk standard sizes having diameters such as 8 inches, 5.25 inches, 3.5 inches, 3 inches and so on. In the case of using the disk with a large diameter, for example, an 8 inch diameter, the radius of the inner track is large and rigidity of the disk is low, so that very good output is obtained without applying this invention. On the other hand, a disk with a diameter of 5.25 inches or less shows effects when applying this invention. In particular, the invention is useful when a disk with a diameter of 3.5 inches or less and a large hub is used. Therefore, as mentioned above, when the rigidity of the disk is high, significant improved effects may be expected in the head according to this invention. Furthermore, where the surface of the disk for a vertical magnetic recording is covered with metallic film such as cobalt or chrome by metallizing or sputtering, the rigidity of the disk is greater than that of an ordinary coated disk for a horizontal magnetic recording. Therefore, it can be seen that the combination of both heads according to this invention has a much improved effect.

It will thus be seen that the objects set forth above, among those made apparent from the preceding description are efficiently attained and, since certain changes may be made in carrying out the above process and in the above article set forth without departing from the spirit and scope of the invention, it is intended that all matters contained in the above description and drawings shall be interpreted as illustrative and not in a limited sense.

It is also to be understood that the following claims are intended to cover all of the generic and specific features of the invention herein described, and all statements of the scope of the invention which, as a matter of language, might be said to fall therebetween.

What is claimed is:

1. A floppy disk drive system for double-sided recording and playback comprising a first and a second head positioned to receive a disk therebetween;
    said first and second head each having a read/write gap and each having a contacting plane for contacting the disk, each such contacting plane having an inner edge positioned toward the center of the disk and an outer edge positioned toward the outer circumference of the disk with a flat portion therebetween including the gap, the inner edge of said second head extending closer to the center of the disk than said inner edge of said first head;
    the gap of said first head being closer to the outer circumference of the disk than the gap of the second head and each gap opposing the flat portion of the other head across the disk when the heads are assembled in facing relation; and
    the distance measured along a radius of the disk between the inner edge of the contacting plane of the first head and the center of the read/write gap of said second head being 0.6mm or less;
    whereby intimate contact between the disk and the second head is maintained even where there is movement of the heads relative to the disk in a direction higher than the proper position for holding the disk.

2. The floppy disk drive system of claim 1, wherein the contacting planes of the first and second heads overlap in a central region including the read/write gaps thereof, the contacting plane of the second head extending beyond the central overlapping region in the direction along a radius of the disk toward the inner circumference of the disk, the contacting plane of the first head extending beyond the central overlapping region in the direction along a radius of the disk toward the outer circumference of the disk.

3. The floppy disk drive system of claim 2, wherein said rectangular magnetic heads on the side thereof disposed toward the center of the disk are chamfered by about C 0.5 or more.

4. The floppy disk drive system of claim 3, wherein all four corners or each of said magnetic heads have been chamfered by about C 0.5 or more.

5. The floppy disk drive system of claim 2, wherein said first head is the lower head and said second head is the upper head.

6. The floppy disk drive system of claim 2, wherein the distance between the respective inner edges of the contacting planes of the first and second heads, measured in the direction along a radius of the disk toward the inner circumference of the disk, is about 0.5 mm to about 1.5 mm, and the distance between the respective outer edges of the contacting planes of the first and second heads, measured in the direction along a radius of the disk toward the inner circumference of the disk, is about 0.5 mm to about 1.5 mm.

7. The floppy disk drive system of claim 1, wherein at least one of said heads is substantially rectangular and at least two corners of the rectangular magnetic head on the side thereof disposed toward the center of the disk is chamfered by about C 0.5 or more.

8. The floppy disk drive system of claim 7, wherein all four corners of said rectangular magnetic head have been chamfered by about C 0.5 or more.

9. The floppy disk drive system of claim 1, wherein said first head is the lower head and said second head is the upper head.

10. A floppy disk drive system for doublesided recording and playback comprising a first and a second head positioned to receive a disk therebetween;
    said first and second head each having a read/write gap and each having a contacting plane for contacting the disk, each such contacting plane having an inner edge positioned toward the center of the disk and an outer edge positioned toward the outer circumference of the disk with a flat portion therebetween including the gap, the contacting plane of the second head being larger than that of the first head, the enlargement of said contacting plane of the second head, in relation to the contacting plane of the first head, being in the direction along a radius of the disk toward the inner circumference of the disk;
    the gap of said first head being closer to the outer circumference of the disk than the gap of the second head and each gap opposing the flat portion of the other head across the disk when the heads are assembled in facing relation; and
    the distance measured along a radius of the disk between the inner edge of the contacting plane of the first head and the center of the read/write gap of said second head being 0.6mm or less;
    whereby intimate contact between the disk and the second head is maintained even where is movement of the heads relative to the disk in a direction higher than the proper position for holding the disk.

11. The floppy disk drive system of claim 10, wherein the distance between the inner edge of the contacting plane of the second head and the inner edge of the contacting plane of the first head, measured in the direction along a radius of the disk toward the inner circumference of the disk, is about 0.5 mm to about 1.5 mm.

12. The floppy disk drive system of claim 10, wherein said heads are substantially rectangular and at least two corners of each of the rectangular magnetic heads on the side thereof disposed toward the center of the disk are chamfered by about C 0.5 or more.

13. The floppy disk drive system of claim 12, wherein all four corners of each of said heads have been chamfered by about C 0.5 or more.

14. The floppy disk drive system of claim 10, wherein said first head is the lower head and said second head is the upper head.

15. A floppy disk drive system for double-sided recording and playback comprising a first and a second head positioned to receive a disk therebetween;

said first and second head each having a read/write gap and each having a contacting plane for contacting the disk, each such contacting plane having an inner edge positioned toward the center of the disk and an outer edge positioned toward the outer circumference of the disk with a flat portion therebetween including the gap, the contacting plane of the first head being larger than that of the second head, the enlargement of said contacting plane of the first head, in relation to the contacting plane of the second head, being in the direction along a radius of the disk toward the outer circumference of the disk;

the gap of said first head being closer to the outer circumference of the disk than the gap of the second head and each gap opposing the flat portion of the other head across the disk when the heads are assembled in facing relation; and the distance measured along a radius of the disk between the inner edge of the contacting plane of the first head and the center or the read/write gap of said second head being 0.6mm or less;

whereby intimate contact between the disk and the second head is maintained even where there is movement of the heads relative to the disk in a direction higher than the proper position for holding the disk.

16. The floppy disk drive system of claim 15, wherein the distance between the outer edge of the contacting plane of the second head and the outer edge of the contacting plane of the first head, measured in the direction along a radius of the disk toward the outer circumference of the disk, is about 0.5 mm to about 1.5 mm.

17. The floppy disk drive system of claim 15, wherein said heads are substantially rectangular and at least two corners of each of the rectangular magnetic heads on the side thereof disposed toward the center of the disk are chamfered by about C 0.5 or more.

18. The floppy disk drive system of claim 17, wherein all four corners of each of said magnetic heads have been chamfered by about C 0.5 or more.

19. The floppy disk drive system of claim 6, wherein said first head is the lower head and said second head is the upper head.

20. A floppy disk drive system for double-sided recording and playback comprising a first head and a second head positioned to receive a disk therebetween;

said first and second heads each having a read/write gap and each having a contacting plane for contacting the disk, each such contacting plane having an inner edge positioned toward the center of the disk and an outer edge positioned toward the outer circumference of the disk;

the gap of the first head being closer to the outer circumference of the disk than the gap of the second head when the heads are assembled in facing relation; and the inner edge of the contacting plane of said second head extending inward a distance of about 0.5mm to 1.5mm in the direction along a radius of the disk toward the inner circumference of the disk, beyond the inner edge of the first head when the heads are assembled in facing relation the inner edge of the first head being offset from the inner edge of the second head;

whereby intimate contact between the disk and the second head is maintained even when there is movement of the heads relative to the disk in a direction lower than the proper position for holding the disk.

21. The floppy disk drive system of claim 20, wherein said heads are substantially rectangular and at least two corners of each of the rectangular magnetic heads on the side thereof disposed toward the center of the disk are chamfered by about C 0.5 or more.

22. The floppy disk drive system of claim 21, wherein all four corners of each of said magnetic heads have been chamfered by about C 0.5 or more.

23. The floppy disk drive system of claim 21, wherein said first head is the lower head and said second head is the upper head.

24. The floppy disk drive system comprising a substantially rectangular magnetic head having a contacting plane for contacting a disk wherein at least the two corners of the rectangular magnetic head which are on the side thereof disposed toward the center of the disk, are chamfered by about C 0.5 or more.

25. The floppy disk drive system of claim 24, wherein all four corners of the rectangular magnetic head are chamfered by about C 0.5 or more.

26. The floppy disk drive system of claim 25, further comprising a second substantially rectangular magnetic head having a contacting plane for contacting a disk in facing relation to said first-mentioned head, wherein the four corners of the second substantially rectangular magnetic head are chamfered by about C 0.5 or more.

27. The floppy disk drive system according to claim 26, wherein the corners of the contacting plane of said two heads, corresponding to the chamfered corners of the head, are smoothly rounded.

28. The floppy disk drive system according to claim 25, wherein the corners of the contacting plane, corresponding to the chamfered corners of the head, are smoothly rounded.

29. The floppy disk drive system of claim 24, further comprising a second rectangular magnetic head having a contacting plane for contacting a disk in facing relation to said first-mentioned head, wherein at least 2 corners of the second rectangular magnetic head, which are on the side thereof disposed toward the center of the disk, are chamfered by about C 0.5 or more.

30. The floppy disk drive system according to claim 29, wherein the corners of the contacting plane of said two heads, corresponding to the chamfered corners of the head, are smoothly rounded.

31. The floppy disk drive system according to claim 24, wherein the corners of the contacting plane, corresponding to the chamfered corners of the head, are smoothly rounded.

32. A floppy disk system for double-sided recording and playback comprising a first head and a second head positioned to receive a disk therebetween;

said first and second head each having read/write gap and each having a contacting plane for contacting the disk, each such contacting plane having an inner edge positioned toward the center of the disk and an outer edge positioned toward the outer circumference of the disk;

the gap of said first head being closer to the outer circumference of the disk than the gap of the second head; and the outer edge of the contacting plane of the first head extending outwardly beyond the outer edge of the second head a distance of about 0.5 mm to 1.5 mm in the direction along a radius of the disk toward the outer circumference of the disk when the heads are in facing relation and the outer edge of the first head is offset from the outer edge of the second head;

whereby intimate contact between the disk and the first head is maintained even when there is movement of the head relative to the disk.

33. The floppy disk drive system of claim 32, wherein said heads are substantially rectangular and at least two corners or each of the rectangular magnetic heads on the side thereof disposed toward the center of the disk are chamfered by about C 0.5 or more.

34. The floppy disk drive system of claim 33, wherein all four corners of each of said magnetic heads have been chamfered by about C 0.5 or more.

35. The floppy disk drive system of claim 32, wherein said first head is the lower head and said second head is the upper head.

36. A floppy disk drive system for double-sized recording and playback comprising a first and a second head positioned to receive a disk therebetween;

said first and second heads each having a read/write gap and each having a contacting plane for contacting the disk, each such contacting plane having an inner edge positioned toward the center of the disk and an outer edge positioned toward the outer circumference of the disk;

the gap of said first head being closer to the outer circumference of the disk than the gap of the second head and the outer edge of the second head being offset from the outer edge of the first head when the heads are assembled in facing relation; and wherein the contacting planes of the first and second heads overlap in a central region including the read/write gaps thereof, the contacting plane of the second head extending beyond the central overlapping region a distance of about 0.5 mm to about 1.5 mm in the direction along a radius of the disk toward the inner circumference of the disk, the contacting plane of the first head extending beyond the central overlapping region a distance of about 0.5 mm to about 1.5 mm in the direction along a radius of the disk toward the outer circumference of the disk even when there is movement of the first head in a direction higher or a direction lower than the proper position for holding the disk.

37. The floppy disk drive system of claim 36, wherein said heads are substantially rectangular and at least two corners of each of the rectangular magnetic heads on the side thereof disposed toward the center of the disk are chamfered by about C 0.5 or more.

38. The floppy disk drive system of claim 37, wherein all four corners of each of said magnetic head have been chamfered by about C 0.5 or more.

39. The floppy disk drive system of claim 36, wherein said first head is the lower head and said second head is the upper head.

* * * * *